United States Patent
Kimura et al.

(10) Patent No.: US 7,535,675 B2
(45) Date of Patent: May 19, 2009

(54) MAGNETIC RECORDING HEAD WITH SHAPED POLE

(75) Inventors: Hisashi Kimura, Kanagawa (JP); Nobuo Yoshida, Kanagawa (JP); Isao Nunokawa, Kanagawa (JP); Kimitoshi Etoh, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 327 days.

(21) Appl. No.: 11/046,356

(22) Filed: Jan. 27, 2005

(65) Prior Publication Data

US 2005/0162778 A1 Jul. 28, 2005

(30) Foreign Application Priority Data

Jan. 28, 2004 (JP) ............................. 2004-020419

(51) Int. Cl.
*G11B 5/147* (2006.01)
*G11B 5/127* (2006.01)

(52) U.S. Cl. ................................ 360/125.09; 360/125.1

(58) Field of Classification Search ................. 360/125, 360/126, 127; 29/602.1, 603.07, 125.01, 29/125.03, 125.09, 125.1, 125.11
See application file for complete search history.

(56) References Cited

U.S. PATENT DOCUMENTS

| | | | | |
|---|---|---|---|---|
| 6,282,056 | B1 * | 8/2001 | Feng et al. | ................... 360/126 |
| 6,504,675 | B1 * | 1/2003 | Shukh et al. | ........... 360/125.12 |
| 6,757,141 | B2 * | 6/2004 | Santini et al. | ................ 360/317 |
| 6,903,900 | B2 * | 6/2005 | Sato et al. | .............. 360/125.12 |
| 6,952,325 | B2 * | 10/2005 | Sato et al. | .............. 360/125.08 |
| 6,999,270 | B2 * | 2/2006 | Watanabe et al. | ........ 360/78.04 |
| 2003/0112555 | A1 * | 6/2003 | Sato et al. | .................... 360/126 |
| 2004/0021985 | A1 * | 2/2004 | Pokhil et al. | ................ 360/126 |
| 2006/0103980 | A1 * | 5/2006 | Sasaki et al. | ................ 360/126 |
| 2006/0119981 | A1 * | 6/2006 | Li et al. | ....................... 360/125 |

FOREIGN PATENT DOCUMENTS

| | | |
|---|---|---|
| JP | 2002-092821 | 3/2002 |
| JP | 2002-197609 | 7/2002 |
| JP | 2002-208112 | 7/2002 |
| JP | 2002-279607 | 9/2002 |
| JP | 2003-242608 | 8/2003 |

* cited by examiner

*Primary Examiner*—Brian E Miller
(74) *Attorney, Agent, or Firm*—Townsend and Townsend and Crew LLP; Rambod Nader

(57) ABSTRACT

Embodiments of the invention provide a thin film magnetic recording head that can reduce the round portion of the track restriction part of the main pole and has excellent track width accuracy, as well as its fabrication method. In one embodiment, the main pole is etched in the following three processes. (1) An ion beam is injected into the substrate at an angle of about 50°±20° while vibrating the substrate horizontally within a range of about ±(30° to 150°) in a reference direction in which the ion beam is oriented from the medium to the air bearing surface. (2) The ion beam is injected into the substrate at an angle of about 60°±20° while vibrating the substrate around a predetermined angle of about 90° to 135° from a direction in which the ion beam is oriented from the medium to the air bearing surface. (3) The ion beam is injected into the substrate at an angle of about 60°±20° while vibrating the substrate horizontally at a predetermined angle within about ±45° around a predetermined angle within about −90° to −135° from a direction in which the ion beam is oriented from the medium to the air bearing surface.

9 Claims, 8 Drawing Sheets

MAGNETIC RECORDING HEAD WITH SHAPED POLE

CROSS-REFERENCES TO RELATED APPLICATIONS

This application claims priority from Japanese Patent Application No. JP 2004-020419, filed Jan. 28, 2004, the entire disclosure of which is incorporated herein by reference.

BACKGROUND OF THE INVENTION

The present invention relates to a magnetic recording head provided with a single pole perpendicular recording head and its fabrication method.

Hard disk drives that are magnetic recording/reproducing devices employed as external recording devices of such information processing apparatuses as computers, etc. are getting more and more increased in capacity and reduced in size, so that those hard disk drives themselves have also been improved mainly in recording density to cope with such improvement. On the other hand, the conventional longitudinal magnetic recording method has been found not to be able to cope with such high recording density requirements. This is because the conventional longitudinal magnetic recording method, when it is to be applied to realize such high recording density, comes to be required to reduce the recording layer in thickness more to cope with the large anti-magnetic field to be generated in the magnetization transition region on the subject medium. If the recording layer is reduced in thickness, the recorded data comes to be erased by thermal confusion. This has been a problem. On the other hand, the perpendicular magnetic recording method, in which the recording layer is magnetized in the direction of the film thickness of the subject medium, makes it easier to achieve the high recording density, since the anti-magnetic field is small in the magnetization transition region, so that the medium is not required to be reduced as much in thickness.

If a so-called perpendicular magnetic recording head (single pole type head) is used to record signals on a perpendicular magnetic recording medium, the electric signals are converted to magnetic signals by a coil and a magnetic flux is excited in both of the main pole and the return pole respectively. A part of the magnetic flux passes through both of the return pole and the main pole, then passes through the perpendicular recording layer of the recording medium. After that, the magnetic flux passes through the soft underlayer formed as a lower layer of the perpendicular recording layer to go back to the return pole just like drawing a closed loop. At that time, the return pole functions to transfer the magnetic flux generated in both of the perpendicular recording layer and the soft underlayer of the recording medium from the main pole to the main pole efficiently. Such a flow of the magnetic flux records magnetized signals on the perpendicular recording medium. The official gazette of JP-A No. 279607/2002 discloses an example of such magnetic recording heads.

Meanwhile, the surface recording density of the perpendicular magnetic recording head has also been improved. Along with the improvement of the surface recording density, it is now desired to reduce the recording track in width while information must be recorded/reproduced widely from inner periphery to outer periphery of the subject magnetic recording medium in each magnetic disk drive. However, information is recorded/reproduced by the magnetic recording head at a skew angle of about −15 to 15° to the tangential line of the medium in the rotational direction at both inner and outer peripheries of the medium. At that time, if the main pole is shaped like a rectangle on the air bearing surface of the main pole, the width of the recording track cannot be reduced. To solve this problem, therefore, a method is proposed to reduce the leading side magnetic pole in width more than the trailing side magnetic pole, thereby narrowing the track in width.

The official gazette of JP-A No. 92821/2002 discloses a method for forming a magnetic recording head having a track that becomes narrower at the main pole leading side than at the main pole trailing side of the main pole on the air bearing surface. According to the method, such a structure is realized by forming a resist frame on a non-magnetic insulation film, then forming a trench in a reactive ion etching (RIE) process. After that, the trench is plated with a magnetic film, then the main pole shaped like an inverted trapezoid is formed in a chemical mechanical polishing (CMP) process.

The official gazette of JP-A No. 197609/2002 discloses another method for forming a main pole shaped like an inverted trapezoid as follows: at first a resist frame is formed on a plated underlayer, then both of the magnetic film and the non-magnetic film are plated. The official gazettes of JP-A No. 208112/2002 and JP-A No. 242608/2003 also disclose a method for forming a main pole shaped like an inverted trapezoid by depositing a non-magnetic film on a magnetic film, then forming a resist frame and plating it thereon, and finally dry-etching the film. The official gazette of JP-A No. 208112/2002 discloses still another method for forming a main pole by subjecting the substrate to an ion milling process while the substrate is vibrating within a range of +90 to −90° with reference to a direction in which an ion beam is oriented from the medium to the air bearing surface. The official gazette of JP-A No. 242608/2003 discloses a method for forming a magnetic recording head that is rectangular in shape at its magnetic flux introduction part. According to those fabrication methods, an ion beam is applied to the substrate at an angle of 45° and over from the normal line side of the substrate respectively.

BRIEF SUMMARY OF THE INVENTION

In the case of the perpendicular magnetic recording head, it is considered to be important to generate a large recording magnetic field with respect to the recording medium. Consequently, the main pole of the magnetic recording head disposed in the above example includes a pillar-shaped track restriction part extended in a direction approximately orthogonal to the air bearing surface of the medium and a magnetic flux introduction part disposed together with the track restriction part side by side in the same row and having an area that increases in proportion to its distance separating from the air bearing surface of the medium.

According to the method disclosed in the official gazette of JP-A No. 208112/2002, the track restriction part is covered by the mask placed on the main pole in the ion milling process, so that the main pole trailing width becomes larger than the main pole leading width (the main pole is thus shaped like an inverted trapezoid). However, part of the magnetic flux introduction part is also covered by the mask placed on the track restriction part around the track restriction part, so that the etching results in unevenness at the magnetic flux introduction part, whereby the plane of the magnetic flux part comes to be deformed. In the example disclosed by the official gazette of JP-A No. 242608/2003, the magnetic pole at its bottom, which is the substrate side of the track restriction part, is covered by the magnetic flux introduction part due to the mask placed on the magnetic flux introduction part in the ion milling process, whereby the main pole becomes narrower in width as the pole goes closer to the air bearing surface of the medium. According to the same method, the cross section of the magnetic flux introduction part that is in parallel to the air bearing surface of the medium comes to be shaped like a rectangle.

On the other hand, as a result of examinations for the methods for forming a main pole with use of the ion milling method respectively, it is found that the magnetic pole is narrowed more in width at its bottom that is the substrate side of the track restriction part as the pole gets closer to the air bearing surface of the medium. At the same time, it is also found that the magnetic pole is also narrowed more in width on the top face of the track restriction part as the pole gets closer to the air bearing surface of the medium, since the pole is covered by the mask placed on the magnetic flux introduction part in the ion milling process. Such a structure that the magnetic pole is narrowed more in width on the top face of the track restriction part as the pole goes closer to the air bearing surface of the medium affects adversely the distribution of the magnetic pole width on the track restriction part provided on the air bearing surface of the medium when the distance of the track restriction part from the air bearing surface is varied by the tolerance in the head fabrication process.

Under such circumstances, it is a feature of the present invention to provide a main pole shaped so as to cope effectively with the variation of the distance of the track restriction part from the air bearing surface and its fabrication method by improving the structure of the main pole provided on the top face of the track restriction part; the structure is narrowed more in width as the pole gets closer to the air bearing surface.

At first, the magnetic recording head fabrication method according to an embodiment of the present invention forms a non-magnetic layer or organic polymer layer having a low etching rate on a magnetic layer, which becomes a main pole. After that, the method uses the non-magnetic layer or organic polymer layer as a mask to etch the surface with use of the ion milling method. The ion milling etching is done in three processes that are changed over as follows.

(1) Etching process for injecting an ion beam into the substrate at an angle of about 50°±20° while vibrating the substrate horizontally within a range of about 30 to 150° with reference to a direction in which the ion beam is oriented from the medium to the air bearing surface or etching process for injecting the ion beam into the substrate from all the directions of 360°.

(2) Etching process for injecting an ion beam into the substrate at an angle of about 60°±20° while vibrating the substrate horizontally within a predetermined angle range of ±45° around a predetermined angle within about +90° to 135° from a direction in which the ion bean is oriented from the medium to the air bearing surface.

(3) Etching process for injecting an ion beam into the substrate at an angle of about 60°±20° while vibrating the substrate horizontally within an angle range of about ±45° around a predetermined angle within a range of about −90° to 135° from a direction in which the ion beam is oriented from the medium to the air bearing surface.

According to the present embodiment, the etching is done in the order of the processes (1), (2), and (3) described above. The etching process (1) may be omitted, however; the main pole may be etched only in the etching processes (2) and (3). The orientation of the ion beam to be applied to the substrate is controlled by rotating the substrate with respect to the ion beam of which orientation is actually fixed. Because the injection angle and orientation of the ion beam are controlled within the surface of the substrate in the ion milling process as described above, the magnetic flux introduction part is pre-vented from standing in the way of the track restriction part, whereby the track restriction part comes to have uniformity in thickness at the trailing side.

There are three elements usable for controlling the orientation of the ion beam to be injected into the substrate in the ion milling process. The first element is an angle between the ion beam and the substrate. If the ion beam is injected into the substrate from a direction of the normal line of the substrate, the injection angle is assumed to be 0°. The second element is how to drive the substrate in the horizontal direction. There are two cases of this method; one case for enabling the substrate to rotate by 360° and the other case for vibrating the substrate around a diameter (vibration axis) of the substrate. According to the present embodiment, in any case except for the injection angle of 0°, the reference vibration axis is assumed to be a direction in which the ion beam injection is oriented from the medium to the air bearing surface. The third element is a range in which the substrate is vibrated horizontally around the vibration axis. If the vibration range is 0°, the injecting direction of the ion beam is fixed.

According to the present invention, therefore, it is possible to provide a magnetic recording head having a main pole that can cope efficiently with the variation of the distance of the track restriction part from the air bearing surface, thereby being capable of improving the recording magnetic field.

DETAILED DESCRIPTION OF THE INVENTION

According to an exemplary embodiment of the present invention, the direction of the ion beam injection is controlled in an etching process to achieve both of the track tolerance and the high magnetization in the main pole of the recording part of the thin film magnetic recording head. Hereunder, an embodiment of the present invention will be described with reference to the accompanying drawings.

Figure 1:
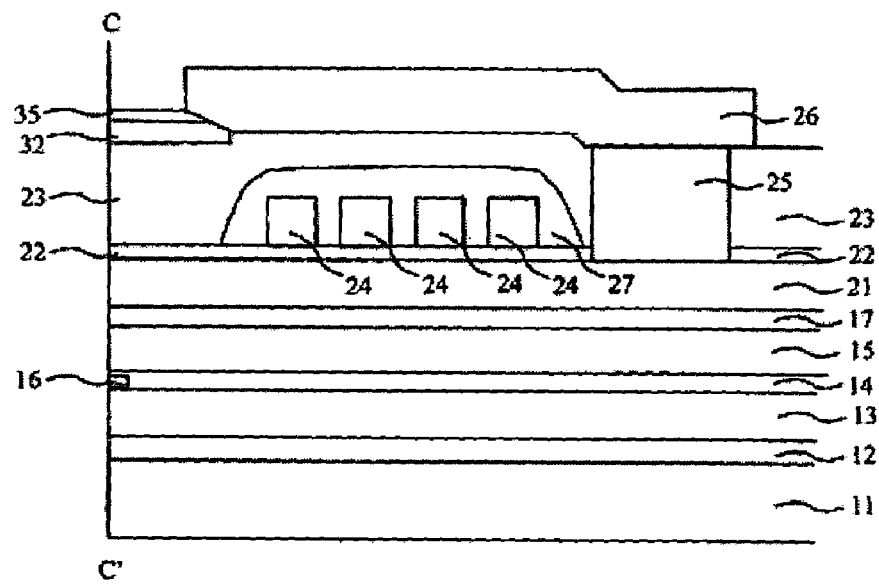
FIG. 1 is a cross sectional view of a magnetic recording head according to an embodiment of the present invention.
Figure 2:
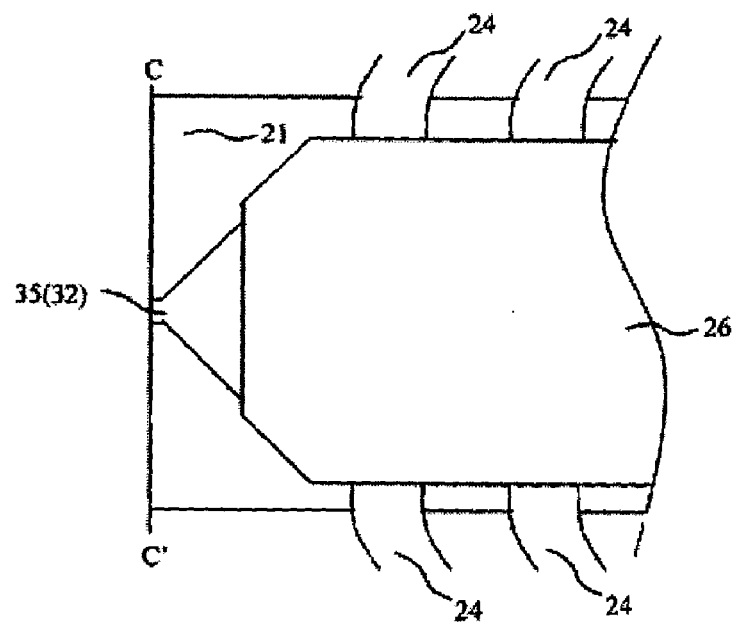
FIG. 2 is a top view of the magnetic recording head according to an embodiment of the present invention.
Figure 3:
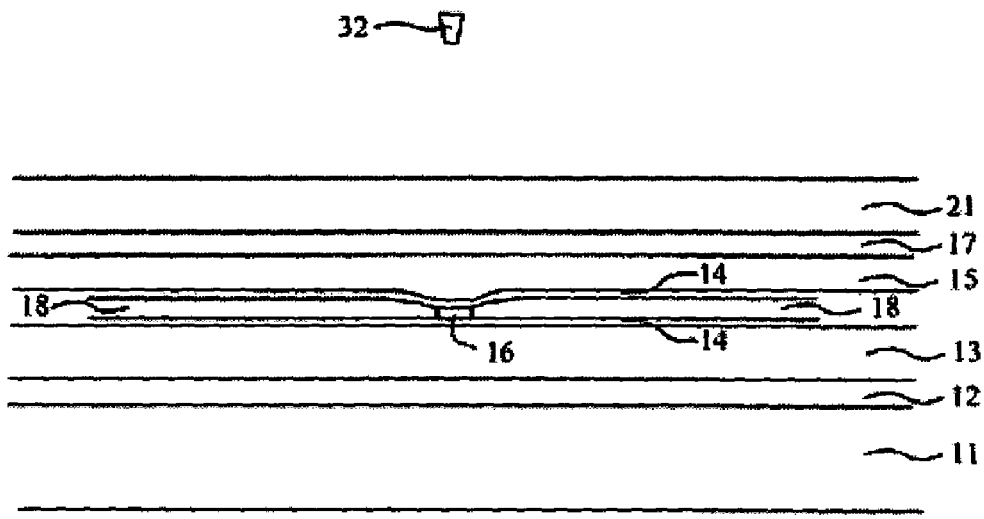
FIG. 3 is an air bearing surface of the magnetic recording head according to an embodiment of the present invention.
Figure 4:
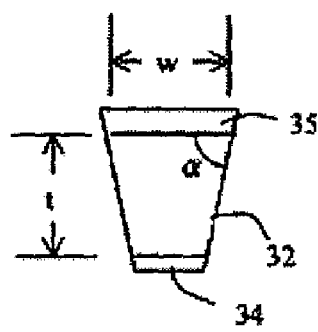
FIG. 4 is an expanded view of the main pole on the air bearing surface of the magnetic recording head according to an embodiment of the present invention.

FIGS. 1 through 4 show examples of a structure of a perpendicular recording magnetic recording head of the present invention. FIG. 1 is a cross sectional view of the magnetic recording head, which is perpendicular to both of the air bearing surface and the substrate surface. FIG. 2 is a top view of the magnetic recording head, which is perpendicular to the air bearing surface and parallel to the substrate surface. FIG. 3 shows the air bearing surface of the magnetic recording head. FIG. 4 is an expanded view of the main pole part provided on the air bearing surface of the magnetic recording head. In these figures, reference numerals and symbols are defined as follows; 11 denotes a substrate, 12 denotes an insulation film, 13 denotes a lower shield, 14 denotes an insulation film, 15 denotes an upper shield, 16 denotes a magnetoresistive effect element, 17 denotes an insulation film, 18 denotes an electrode, 21 denotes a return pole, 22 denotes an insulation film, 23 denotes an insulation film, 24 denotes a coil, 25 and 26 denote yokes, 27 denotes an insulation film, 32 denotes a main pole, 34 denotes an under film, and 35 denotes a non-magnetic metallic film. C-C' denotes the air bearing surface (ABS) of the magnetic recording head.

The reproducing part of the illustrated magnetic recording head includes the lower shield 13, the magnetoresistance effect film 16, and the upper shield 15. The electrode 18 and a magnetic section control layer (not shown) are connected to both sides of the magnetoresistance effect film 16. The magnetoresistance effect film 16 can be formed with an AMR (anisotropic magnetoresistance effect) film having a magnetoresistance effect, for example. The magnetoresistance effect film 16 may also be formed with any of a TMR (tunnel magnetoresistance effect film) and a CPP type magnetoresistance effect film, each of which enables a current to flow perpendicularly to the film. The recording part of the illustrated magnetic recording head has a coil 24 formed on the return pole 21 through the insulation film 22. The coil 24 is covered by the insulation film 27. The return pole 21 is connected to the main pole magnetically through the yokes 25 and 26.

As shown in FIG. 2 (top view), the main pole 32 is formed thin up to a region 20 nm to 500 nm away from the air bearing surface and pillar-like perpendicular to the air bearing surface line C-C'. At a position away further therefrom, the main pole 32 becomes wider in proportion to its distance from the air bearing surface. Because the main pole is structured such way, the magnetic recording head can generate a large magnetic field on the recording medium.

As shown in FIG. 3, the air bearing surface of the magnetic recording head of the present embodiment has the main pole 32 formed on the return pole 21 through the insulation film 23. In this example, while the return pole 21 is positioned at the leading side of the main pole 32, the positions of the main pole 32 and the return pole 21 may be exchanged. The air bearing surface of the magnetic recording head may be structured so that the main pole is formed on the soft magnetic film through the non-magnetic film (trailing shield) or a soft magnetic film may be formed at both sides of the main pole through a non-magnetic film respectively (side shield).

In the expanded view shown in FIG. 4, the underlayer 34 is formed in the lower layer of the main pole 32 to improve the magnetic characteristic of the main pole 32 and the non-magnetic metallic layer 35 is formed in the upper layer of the main pole 32. The main pole 32 is formed of such a magnetic film having saturated magnetic flux density as FeCo, CoNiFe, etc., or laminated film consisting of FeCo and a non-magnetic film. The non-magnetic metallic film 35 may be formed of NiCr, Cr, Ta, or TaW.

As described above, the track width of the main pole 32 on the air bearing surface becomes narrower at the lower side (leading side) of the main pole 32, the magnetic recording head never erases data in adjacent tracks by mistake if the data is recorded at a skew angle. The track width w of the main pole 32 structured as a single magnetic film or laminated film consisting of a magnetic film and a non-magnetic film becomes narrower as the recording density increases more; for example, the width w is about 40 to 200 nm. The film thickness t of the main pole is limited within about 0.5 to 3 nm with respect to the track width and the inner angle α between one side and its adjacent side at the trailing side on the track regulation surface of the main pole 32 should preferably be about 75 to 85°. The film thickness of the under film 34 should preferably be within about 2 to 20 nm.

Figure 5:
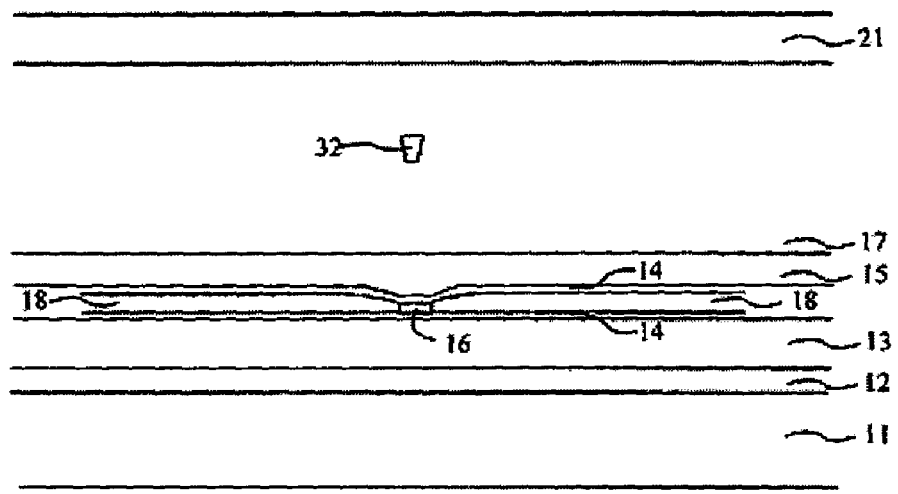
FIG. 5 is another air bearing surface of the magnetic recording head according to an embodiment of the present invention.

FIG. 5 shows another example of the positional relationship between the main pole and the return pole of the perpendicular recording magnetic recording head of the present invention. In this example, unlike the example shown in FIG. 2, the return pole 21 is positioned at the trailing side of the main pole 32. When in such a positional relationship, a soft magnetic film may be formed on the main pole through a non-magnetic film (referred to as a trailing shield) or this soft magnetic film may come in contact with the return pole. Otherwise, a soft magnetic film may be formed at both sides of the main pole through a non-magnetic film respectively (referred to as a side shield) and this soft magnetic film may come in contact with the return pole.

Figure 6:
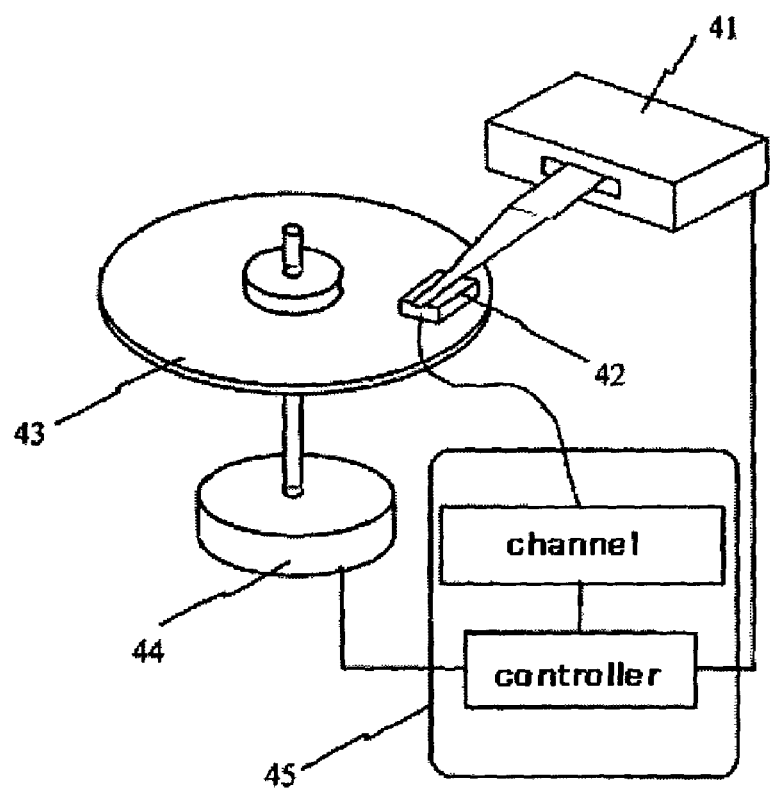
FIG. 6 is a schematic illustration of a magnetic disk unit that uses the magnetic recording head of the present invention.

FIG. 6 is a schematic illustration of a magnetic disk unit that uses the perpendicular recording magnetic recording head of the present embodiment. This disk unit comprises a perpendicular magnetic recording magnetic disk 43 having a magnetic recording layer and a soft underlayer, a motor 44 for supporting and rotating the magnetic disk 43, an actuator 41 for rocking the magnetic recording head 42 so as to be moved horizontally (right and left) on the magnetic disk 43, a signal processing circuit 45, etc. The magnetic recording head 42 includes a perpendicular magnetic recording head (single pole type head) and a reproduction head for reproducing information recorded on the magnetic disk 43. The signal processing circuit 45 includes a controller and a channel. The controller controls the actuator 41 and the motor 44 and the channel processes recording signals to be applied to the recording head of the magnetic recording head 42 and reproduction signals received from the reproduction head of the magnetic recording head 42.

Figure 7:
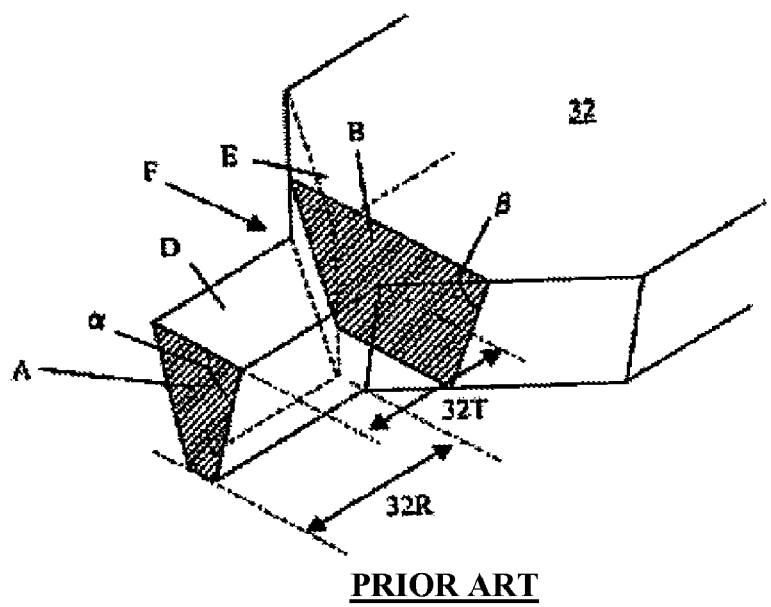
FIG. 7 is a perspective view of a conventional magnetic recording head.
Figure 8:
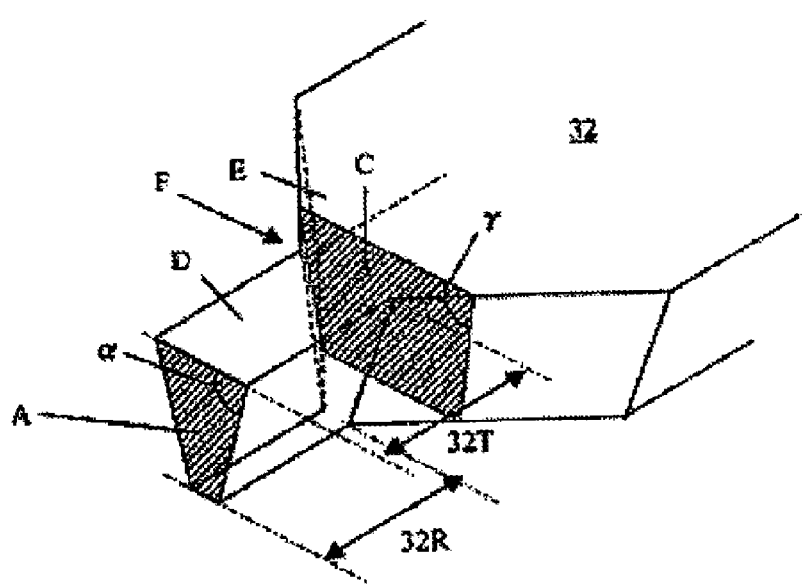
FIG. 8 is a perspective view of the magnetic recording head according to an embodiment of the present invention.

FIG. 7 is a perspective view of a conventional thin film magnetic recording head while FIG. 8 is a perspective view of the main pole of the thin film magnetic recording head of the present embodiment. As shown in FIGS. 7 and 8, the main pole 32 of the thin film magnetic recording head includes a pillar-like track restriction part D extending approximately perpendicularly from the air bearing surface and a magnetic flux introduction part E connected to the track restriction part. The track restriction part D is almost fixed in width. The connected portion of the track restriction part D and the magnetic flux introduction part E is referred to as a resist flame F. The width of the magnetic flux introduction part E (in the direction of the track width) becomes the narrowest at the resist flame F and becomes wider in proportion to its distance from the resist flame F. Assume now that a cross section B is positioned on the air bearing surface close to the resist flame F of the magnetic flux introduction part E of the main pole 32 and an inner angle between one side of the trailing side and its adjacent side in the cross sectional shape is β. An inner angle between one side of the trailing side and its adjacent side on the air bearing surface of the track restriction part D of the main pole, that is, the track regulating surface A is defined as α.

As shown in FIG. 7, in the case of the main pole 32 of the conventional thin film magnetic recording head, the inner angle β at the cross section B of the magnetic flux introduction part E, which is parallel to the air bearing surface, is smaller than the inner angle α on the track restriction surface A. While it depends on the spread angle of the magnetic flux introduction part E, the inner angle β is selected within a range of 65 to 80°. On the other hand, as shown in FIG. 8, in the case of the main pole 32 of the present embodiment, the inner angle γ at the cross section B of the magnetic flux introduction part E, which is parallel to the air bearing surface, is larger than the inner angle α on the track restriction surface A and the inner angle γ is selected within a range of about 80 to 89°. If this inner angle γ is 80° and under, the head magnetic field is not improved so much. If the inner angle γ is 89° and over, the fabrication is difficult, so that the inner angle γ is selected within a range of about 80 to 89°.

If the inner angle β is smaller than the inner angle α as seen in the conventional structure, the length 32R of the track restriction part D at the leading side perpendicular to the medium becomes longer than the length 32T at the trailing side. On the other hand, according to the present embodiment, the range of the inner angle γ of the magnetic flux introduction part E is selected so that the length 32R of the track restriction part D at the leading side perpendicular to the medium becomes shorter than the length 32T of that at the trailing side. If the inner angle γ is determined to be larger than the inner angle α and the inner angle γ is determined to be 90° and under as seen in the present embodiment, the length 32R at the leading side can be reduced until it becomes shorter than that of the conventional structure, whereby the head magnetic field can be improved in strength by about 5 to 20%.

Next, how to fabricate the magnetic recording head according to an embodiment of the present invention will be described. The method for forming both upper and lower layers of the main pole 32 is already known, so that only the method for forming the main pole 32 will be described here.

Figure 9:
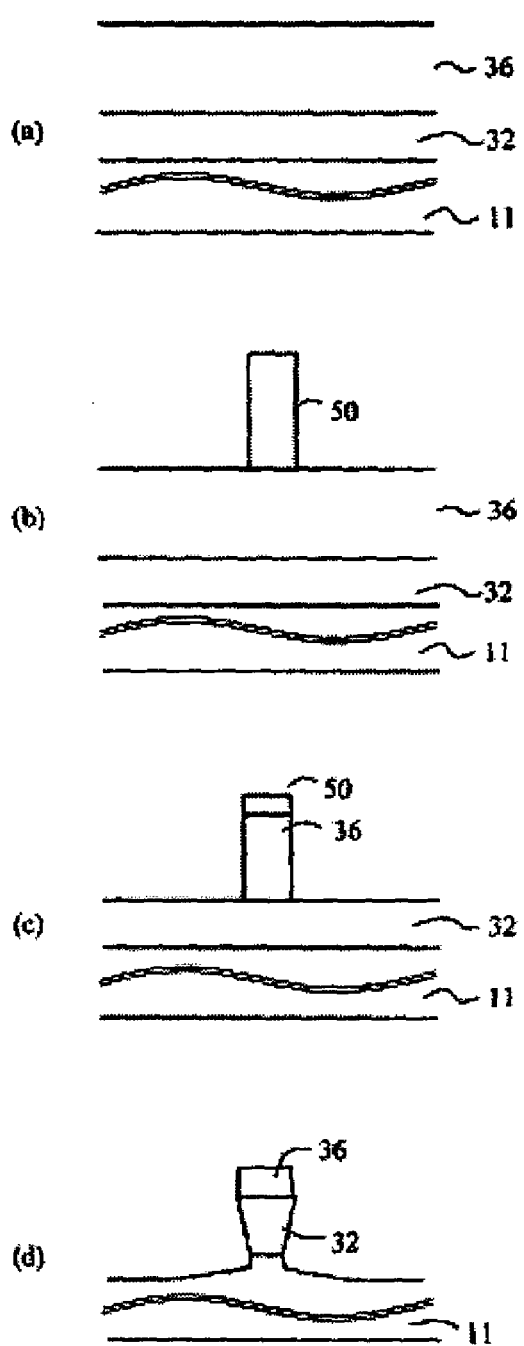
FIG. 9 shows cross sectional views of the magnetic recording head according to an embodiment of the present invention in the fabrication processes.

FIG. 9 shows cross sectional views of the magnetic recording head according to an embodiment of the present invention in an example of the fabrication processes. As shown in FIG. 9A, the lower layer of the main pole is formed on the substrate 11, then the magnetic film assumed as the main pole 32 is formed of, for example, FeCo or CoNiFe at a thickness of about 50 to 300 nm. A second masking layer 36 is formed on the main pole 32 at a thickness of about 100 to 1000 nm. The second masking layer 36 is a non-magnetic layer or organic resin layer. After that, a resist film 50 is formed on the second mask 36, then the resist film 50 is patterned into a first mask as shown in FIG. 9B. The resist film 50 is about 200 to 1500 nm in thickness. After that, as shown in FIG. 9C, the first mask is used to form a second masking layer into a predetermined form through etching. If the second masking layer 36 is a non-magnetic layer, a chlorine etching gas is used. If the second masking layer 36 is an organic resin layer, an $O_2$ or $CO_2$ etching gas is used. The second masking layer 36 should be etched to become approximately orthogonal to the substrate 11. After that, as shown in FIG. 9D, the second masking layer 36 is used for ion-etching the main pole 32 to shape it like an inverted trapezoid. Hereinafter, the process shown in FIG. 9D will be described in detail with reference to the top view of the main pole.

Figure 10:
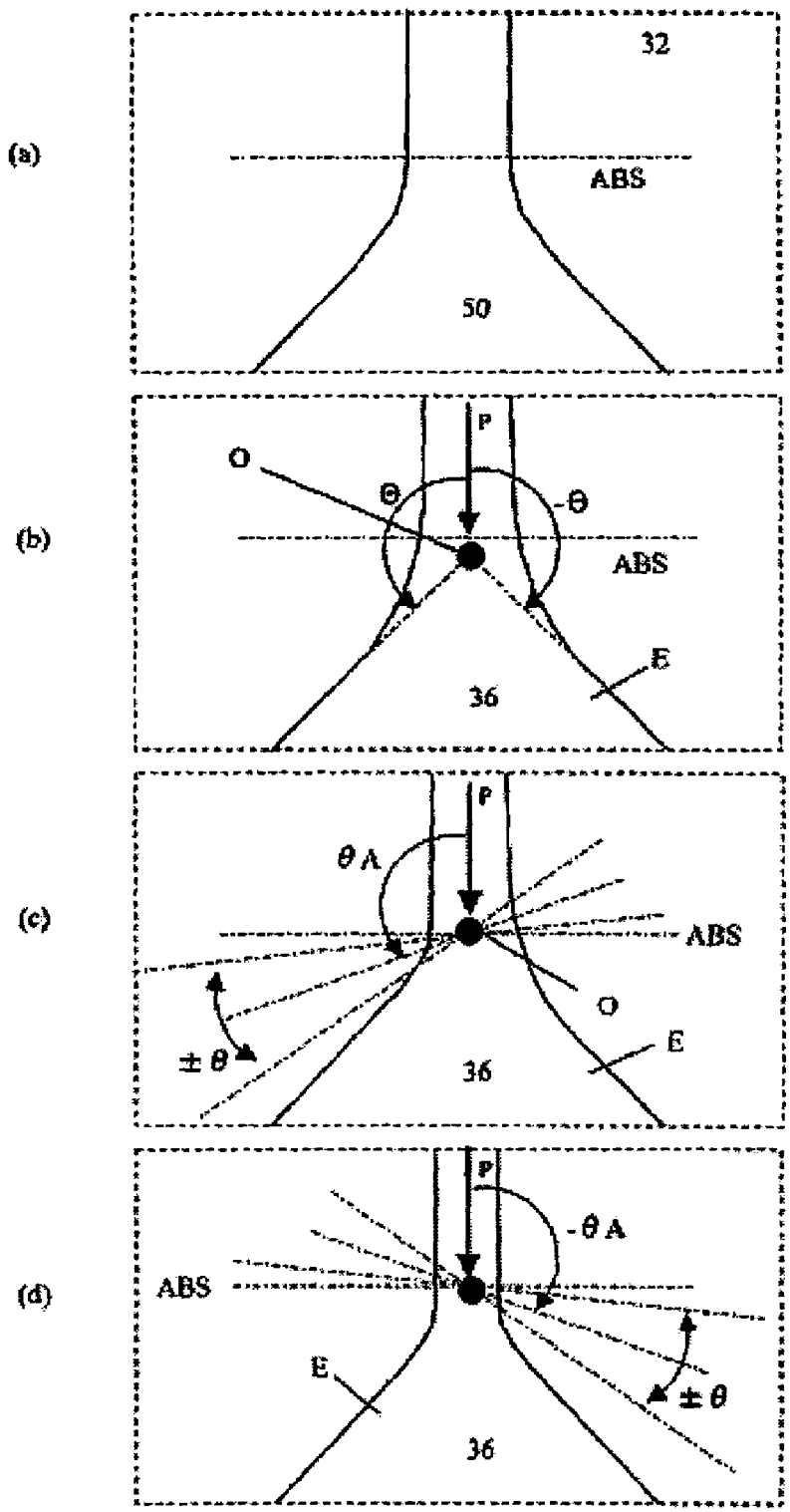
FIG. 10 shows top views of the magnetic recording head according to an embodiment of the present invention in the fabrication processes.

FIG. 10A is a top view of the main pole shown in FIG. 9D. A second masking layer 36 and a main pole layer 32 are formed in the lower layer of the resist 50. FIG. 9B to FIG. 9D describe the main pole processes. In the processes shown in FIG. 9D may be combined with the process shown in FIG. 10C and performed after the process in FIG. 10B. The process shown in FIG. 10B may be omitted so that only the processes shown in FIG. 10C and FIG. 10D are performed.

FIG. 10B shows a process for etching the main pole 32 using the second masking layer as a mask. The ion milling method is used for this main pole etching. The ion beam injection angle is selected within a range of about 50±20° (30° to 70°) if the direction of the normal line to the substrate surface is 0° and the ion beam injection angle is 30° and under, a re-spattering layer is formed at both sides of the second masking layer and if the injection angle is 70° and over, the etching time of the main pole 32 becomes very long.

If the direction from the air bearing surface ABS denoted with an arrow P in FIG. 10A to the element height is assumed as a reference direction and the angle between the tangential line of the magnetic flux introduction part E and the reference direction is Θ, −Θ, the substrate is rotated by 360° horizontally or the substrate is vibrated so that the ion beam injects into the substrate at an angle within ±θ(θ≦Θ) with respect to the origin o. If the substrate is vibrated so that the etching time of the main pole 32 becomes comparatively shorter than that when the substrate is rotated by 360°, whereby the second masking layer 36 can be reduced more in thickness. If the milling condition that assumes the vibration range ±θ to be θ=30° to 150° is satisfied, the problem that the magnetic flux introduction part comes to hinder the ion beam is reduced, whereby the main pole comes to be etched more quickly. If the etching time is reduced in such a way, the second masking layer can be reduced in thickness, whereby the track width accuracy is improved. The etching process that employs this ion milling should preferably be performed until the main pole material 32 is eliminated from every part except in the lower portion of the second mask 36 and around the resist flame.

FIG. 10C shows another process for ion milling of the main pole using the second masking layer 36 as a mask. If the ion beam injection angle here is 45° and under when the normal line to the substrate surface is 0°, the inner angle α becomes about 85° and if the injection angle is 75° and over, the object side of the track restriction surface comes to be bent like a V-letter. The injection angle is thus selected within a range of about 60±15°(45° to 85°).

The direction from the air bearing surface ABS shown with an arrow in FIG. 10A to the element height is defined as a reference direction and the substrate is vibrated horizontally so that the ion beam is injected into the substrate at an angle within ±θ with respect to the origin o. The ±θ vibration axis θA is selected between the ABS and the tangential line of the magnetic flux introduction part E. The angle of the tangential line of the magnetic flux introduction part is about 135° to 145°, so that the θA is set at about 90° to 135°. The vibration range ±θ is set at an angle selected within a range of about ±45° around the vibration axis θA. The vibration range ±45° is selected so as to minimize the problem that the magnetic flux introduction part comes to hinder the ion beam injection. Selection of the vibration axis and the vibration range as described above makes it possible to make the inner angle γ larger than the inner angle α, thereby realizing a higher magnetic field. The inner angle γ is generated by one side and its adjacent side at the trailing side of the main pole at the cross section B thereof, which is parallel to the air bearing surface of the magnetic flux introduction part of the main pole 32 and the inner angle α is generated by one side and its adjacent angle at the trailing side of the track restriction surface A of the main pole. The ion beam injection thus comes to be prevented more from a problem that the magnetic flux introduction part comes to interrupt the ion beam, so that the ion beam is injected to the left side wall of the main pole 32. This is why it is prevented that the magnetic flux introduction part hides the pole width on the top face of the track restriction part, whereby the pole is narrowed more in width in proportion to its distance from the air bearing surface.

FIG. 10D shows an ion milling process symmetrical to that shown in FIG. 10C. By performing the processes shown in FIG. 10D and FIG. 10C, two inner angles generated by one side and its adjacent side at the trailing side of the track restriction surface A of the main pole become symmetrical. If the etching time/angle (ion beam irradiation time) or ion beam injection angle is asymmetrical between the processes shown in FIG. 10C and FIG. 10D, the inner angles α1 and α2 generated at both sides of one side at the trailing side of the track restriction surface A of the main pole come to differ from each other, whereby the shape of the track restriction surface A comes to be asymmetrical at its right and left sides. Because the inner angles α1 and α2 that are such asymmetrical are generated as described above, even when the skew angle between the medium and the magnetic recording head in the subject hard disk drive differs between the inner periphery and the outer periphery of the medium, the track restriction surface is optimized in shape at both of the inner and outer peripheries.

Figure 11:
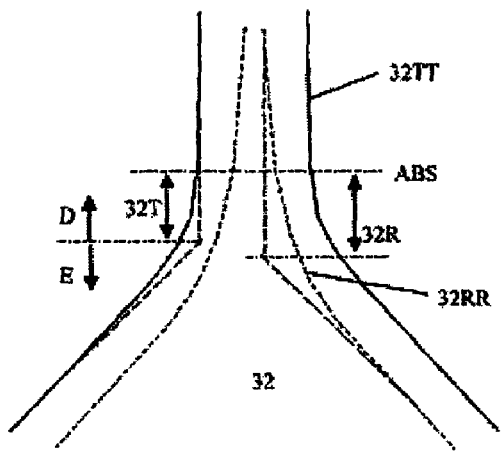
FIG. 11 is a top view of the conventional magnetic recording head.

FIG. 11 shows a top view of the conventional main pole shown in FIG. 7. The trailing side face of the main pole is denoted with 32TT and the leading side face of the main pole is denoted with 32RR. In FIG. 7, while the boundary between the track restriction part D and the magnetic flux introduction part E is square, the shape is actually round as shown in FIG. 11. This round shape is caused by the limit of the resolution of the lithography and the ion milling process described above. In this specification, the track restriction part D is assumed to be at the air bearing surface side from the viewpoint of the intersecting point between the trailing side tangential line of the track restriction part D and the trailing side tangential line of the magnetic flux introduction part E and the magnetic flux introduction part E is assumed to be at the opposite side from the same intersecting point. In FIG. 11, the pole width at the trailing side of the track restriction part is found to be reduced in size as the pole gets closer to the ABS. And, as shown in FIG. 11, in the case of the main pole 32 of the conventional magnetic recording head, the distance 32R between the leading side ABS and the resist flame is longer than the distance 32T between the trailing side ABS and the resist flame.

Figure 12:
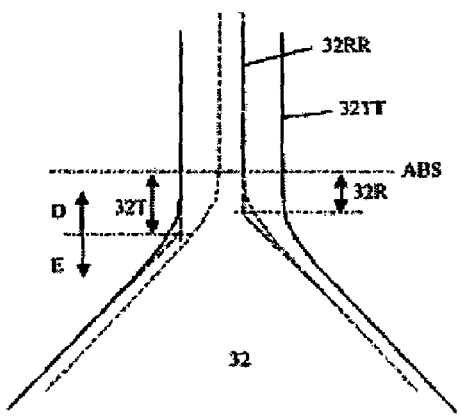
FIG. 12 is a top view of the magnetic recording head according to an embodiment of the present invention.

FIG. 12 shows a top view of the main pole of the present embodiment, shown in FIG. 8. As shown in FIG. 12, the present embodiment shapes the boundary between the track restriction part D and the magnetic flux introduction part E as a round one smaller than that shown in FIG. 11. When compared with the conventional fabrication method, the range in which the pole is narrowed more in width at the trailing side of the track restriction part D as it gets closer to the ABS, the surface shape of the main pole comes to be affected less by the variation of the length of the track restriction part D. As shown in FIG. 12, in the case of the main pole 32 of the magnetic recording head of the present embodiment, the distance 32R between the leading side ABS and the resist flame is shorter than that 32T between the trailing side ABS and the resist flame.

Figure 13:
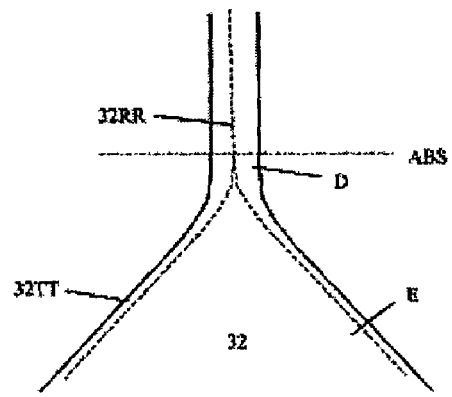
FIG. 13 is another top view of the magnetic recording head according to an embodiment of the present invention.

FIG. 13 is a top view of the main pole having another shape obtained by the fabrication method according to another embodiment of the present invention. In the case of the main pole in this example, the pole is almost 0 in width on the ABS surface of the leading side 32RR and the pole is shaped like a triangle on the track restriction surface A. Because of this shape, the film thickness of the magnetic flux introduction part E can increase more than that of the track restriction surface A of the main pole 32. Consequently, the cross section of the head, shaped as described above, can improve the magnetic field of the head.

Figure 14:
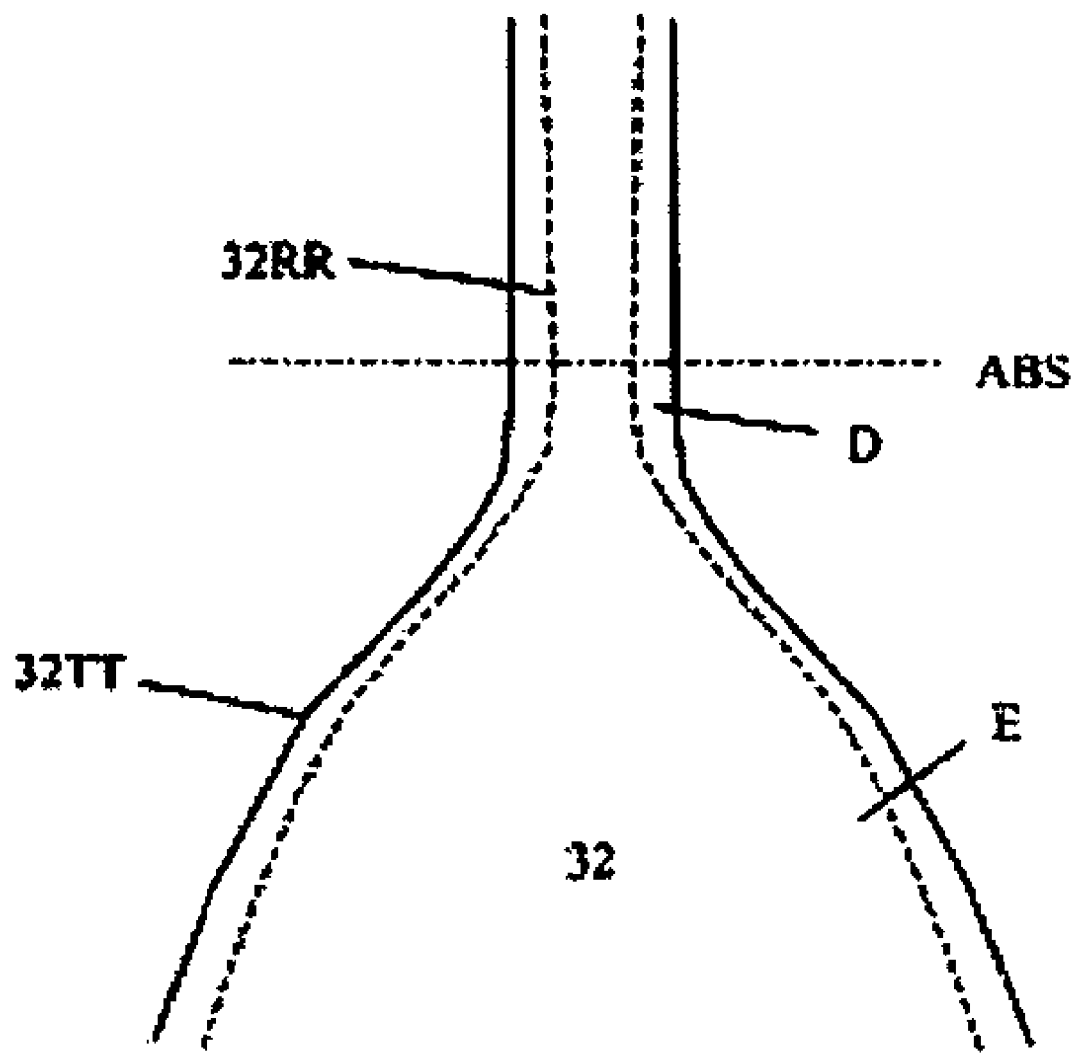
FIG. 14 is still another top view of the magnetic recording head according to an embodiment of the present invention.

FIG. 14 shows a top view of the main pole having still another shape obtained by the fabrication method according to another embodiment of the present invention. The main pole 32 in this example is reduced in size at a position where the spreading angle of the magnetic flux introduction part E is away from the track restriction part D. When the main pole 32 takes such a top shape, the inner angle γ generated between the upper bottom and its adjacent side of the cross section of the magnetic flux introduction part E, which is parallel to the air bearing surface in the present embodiment, means an inner angle of the cross section assumed in the region of the magnetic flux introduction part E around the track restriction part D. Even when the main pole 32 takes a shape as shown in FIG. 14, a higher magnetic field can be realized and the magnetization accuracy can be improved.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic recording head including:
    a substrate;
    a main pole provided on said substrate; and
    a return pole provided on said substrate and connected to said main pole electrically;
    wherein said main pole includes a pillar-like track restriction part extended approximately perpendicularly from an air bearing surface; and a magnetic flux introduction part connected to said track restriction part and having a cross sectional area at a connection portion with said track restriction part that is parallel to said air bearing surface and increases as said introduction part goes further away from said air bearing surface;
    wherein said main pole is shaped on said air bearing surface to have a lower side closer to said substrate which is shorter than an upper side away from said substrate;
    wherein an inner angle generated between said upper side and an adjacent side of said track restriction part on said air bearing surface is defined as α and an inner angle generated between said upper side and an adjacent side thereof at a cross section of said magnetic flux introduction part that is parallel to said air bearing surface at a position closer to a part connected to said track restriction part is defined as γ, a relationship between α and γ becomes γ>α, and
    wherein a length of the track restriction part from an edge of the leading side perpendicular to the air bearing surface to the cross sectional area, is shorter than a length of the track restriction part from an edge of the trailing side perpendicular to the air bearing surface to the cross sectional area.

2. The magnetic recording head according to claim 1, wherein said inner angle γ is within about 80° and 89°.

3. The magnetic recording head according to claim 1, wherein a size of said track restriction part in a direction perpendicular to said air bearing surface is shorter at a portion closer to said substrate than a size of said track restriction part at a portion away from said substrate.

4. The magnetic recording head according to claim 1, wherein said return pole is positioned at a leading side of the magnetic recording head with respect to the main pole.

5. The magnetic recording head according to claim 1, wherein said return pole is disposed at a trailing side of the main pole.

6. A magnetic recording/reproducing apparatus including:
a magnetic recording medium including a magnetic recording layer and a soft underlayer;
a medium driving part configured to drive said magnetic recording medium;
a magnetic recording head for recording/reproducing information on/from said magnetic recording medium;
a magnetic recording head driving part configured to drive said magnetic recording head relatively to said magnetic recording medium; and
a signal processing part configured to process recording signals to be sent to said magnetic recording head and reproducing signals received from said magnetic recording head,
wherein said magnetic recording head includes a substrate; a main pole provided on said substrate; and a return pole provided on said substrate and connected to said main pole electrically;
wherein said main pole includes a pillar-like track restriction part extended approximately perpendicularly from said air bearing surface; and a magnetic flux introduction part connected to said track restriction part and having a cross sectional area at a connection portion with said track restriction part that is parallel to said air bearing surface and increases in proportion to a distance thereof separating from said air bearing surface;
wherein said main pole is shaped on said air bearing surface so that a lower side thereof closer to said substrate becomes shorter than an upper side thereof away from said substrate;
wherein an inner angle generated between said upper side and an adjacent side of said track restriction part on said air bearing surface is defined as $\alpha$ and an inner angle generated between said upper side and an adjacent side at a cross section of said magnetic flux introduction part parallel to said air bearing surface at a position closer to a part connected to said track restriction part is defined as $\gamma$, a relationship between $\alpha$ and $\gamma$ becomes $\gamma > \alpha$, and
wherein a length of the track restriction part from an edge of the leading side perpendicular to the air bearing surface to the cross sectional area, is shorter than a length of the track restriction part from an edge of the trailing side perpendicular to the air bearing surface to the cross sectional area.

7. The magnetic recording/reproducing apparatus according to claim 6, wherein said inner angle $\gamma$ is within about 80° and 89°.

8. The magnetic recording/reproducing apparatus according to claim 6, wherein said return pole is positioned at a leading side of the magnetic recording head with respect to the main pole.

9. The magnetic recording/reproducing apparatus according to claim 6, wherein said return pole is disposed at a trailing side of the main pole.

* * * * *

UNITED STATES PATENT AND TRADEMARK OFFICE
CERTIFICATE OF CORRECTION

| | | |
|---|---|---|
| PATENT NO. | : 7,535,675 B2 | Page 1 of 1 |
| APPLICATION NO. | : 11/046356 | |
| DATED | : May 19, 2009 | |
| INVENTOR(S) | : Kimura et al. | |

It is certified that error appears in the above-identified patent and that said Letters Patent is hereby corrected as shown below:

In the Title:

Title Page, (54), please delete "Magnetic recording head with shaped pole" and insert -- Magnetic recording head with shaped pole and fabrication process --

Signed and Sealed this

Fourteenth Day of July, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,535,675 B2  Page 1 of 1
APPLICATION NO. : 11/046356
DATED : May 19, 2009
INVENTOR(S) : Kimura et al.

It is certified that error appears in the above-identified patent and that said Letters Patent is hereby corrected as shown below:

In the Title:

Title Page, (54) and Column 1, lines 1 and 2, please delete "Magnetic recording head with shaped pole" and insert -- Magnetic recording head with shaped pole and fabrication process --

This certificate supersedes the Certificate of Correction issued July 14, 2009.

Signed and Sealed this

Eighteenth Day of August, 2009

David J. Kappos
*Director of the United States Patent and Trademark Office*